United States Patent
Yi et al.

(10) Patent No.: US 8,550,479 B2
(45) Date of Patent: Oct. 8, 2013

(54) INFANT CARRIER APPARATUS PROVIDED WITH A CHILD HOLDING ACCESSORY AND METHOD OF INSTALLING THE SAME

(75) Inventors: Zehua Yi, Central Hong Kong (HK); I-Ting Yeh, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 143 days.

(21) Appl. No.: 12/974,079

(22) Filed: Dec. 21, 2010

(65) Prior Publication Data

US 2011/0156454 A1  Jun. 30, 2011

(30) Foreign Application Priority Data

Dec. 25, 2009  (CN) .......................... 2009 1 0262642

(51) Int. Cl.
*B62B 9/24* (2006.01)

(52) U.S. Cl.
USPC ....... 280/47.38; 29/428; 280/650; 297/184.1; 297/184.11; 297/184.12; 297/184.13; 297/184.14; 297/184.15; 297/184.16; 297/184.17

(58) Field of Classification Search
None
See application file for complete search history.

(56) References Cited

U.S. PATENT DOCUMENTS

| | | | |
|---|---|---|---|
| 1,372,538 A | | 3/1921 | Olson |
| 2,770,488 A | * | 11/1956 | Kuniholm et al. ........ 296/107.02 |
| 5,184,865 A | * | 2/1993 | Mohtasham et al. ........ 296/77.1 |
| 6,530,591 B2 | * | 3/2003 | Huang .......................... 280/650 |
| D578,044 S | * | 10/2008 | Chen et al. ................... D12/129 |
| 2007/0108710 A1 | * | 5/2007 | Pennisi et al. ............. 280/47.38 |

FOREIGN PATENT DOCUMENTS

WO   WO 2007109692 A2 * 9/2007
WO   2009065129 A1   5/2009

* cited by examiner

*Primary Examiner* — J. Allen Shriver, II
*Assistant Examiner* — Hilary L Johns
(74) *Attorney, Agent, or Firm* — David I. Roche; Baker & McKenzie LLP

(57) ABSTRACT

An infant carrier apparatus comprises a support frame, a seat assembly and handle assembly respectively connected with the support frame, a backrest frame, and a child holding accessory. The child holding accessory can be detachably installed on the infant carrier apparatus, supported by the backrest frame and the handle assembly. In one embodiment, the child holding accessory includes a support bracket and an enclosure. For installing the child holding accessory, the backrest frame is adjusted to a position inclined forward. The child holding accessory can be then installed between the backrest frame and the handle assembly, wherein the child holding accessory has two opposite end portions respectively connected with the backrest frame and the handle assembly.

10 Claims, 8 Drawing Sheets

INFANT CARRIER APPARATUS PROVIDED WITH A CHILD HOLDING ACCESSORY AND METHOD OF INSTALLING THE SAME

CROSS-REFERENCE TO RELATED APPLICATION

This application claims priority to China Patent Application No. 200910262642.8 filed on Dec. 25, 2009.

BACKGROUND

1. Field of the Invention

The present invention relates to an infant carrier apparatus, and more particularly to an infant carrier apparatus that has a detachable child holding accessory and a method of installing the same.

2. Description of the Related Art

A stroller apparatus typically comprises a support frame provided with wheels, a seat, a backrest and a handle assembly. After a child is placed on the seat, the parent can use the handle to push the stroller in movement. In certain strollers, the seat may be made of a rigid material, which may not provide comfortable support when the child is seated for a prolonged period of time. In other strollers, the seat and backrest may also be designed to provide two seating configurations, i.e., facing forward and rearward. When the backrest is inclined toward the front of the infant carrier apparatus, the child can be seated oriented rearward facing the caregiver. While the sight of the caregiver is intended to comfort the child, the distance separating the seated child from the caregiver may mitigate the benefit of the seating position facing rearward.

Therefore, there is a need for an improved infant carrier apparatus that allows the placement of the child in a comfortable position closer to the caregiver, and address at least the foregoing issues.

SUMMARY

The present application describes an infant carrier apparatus on which a child holding accessory can be detachably installed to receive the placement of a child in either of a seating and reclining position.

In one embodiment, the infant carrier apparatus can comprise a support frame, a seat assembly connected with the support frame, a backrest assembly including a backrest frame pivotally adjustable to different positions relative to the seat assembly, a handle assembly connected with the support frame, and a detachable child holding accessory adapted to provide support for a child, wherein the child holding accessory is supported by at least one of the backrest frame and the handle assembly.

In one embodiment, the child holding accessory comprises a support bracket, and an enclosure adapted to provide support for a child, wherein the child holding accessory has two opposite end portions adapted to detachably fasten with the backrest frame and the handle assembly, whereby the child holding accessory once installed is supported by the backrest frame and the handle assembly of the infant carrier apparatus.

In other embodiments, the present application describes a method of installing the child holding accessory on the infant carrier apparatus. The method can comprise placing the handle assembly in a position inclined toward a front of the infant carrier apparatus, and installing the child holding accessory between the backrest frame and the handle assembly, wherein the child holding accessory has two opposite end portions respectively connected with the backrest frame and the handle assembly, whereby the child holding accessory is supported by at least one of the backrest frame and the handle assembly.

At least one advantage of the infant carrier apparatus described herein is the ability to install a holding accessory that can provide support for a child close to the caregiver, at the rear of the infant carrier apparatus. When it is not used, the child holding accessory can be easily removed from the infant carrier apparatus, and collapsed into a compact form for convenient storage.

DETAILED DESCRIPTION OF THE EMBODIMENTS

The present application describes an infant carrier apparatus having a holding accessory that can provide support for a child close to the caregiver, at the rear of the infant carrier apparatus. When it is not used, the child holding accessory can be easily removed from the infant carrier apparatus, and collapsed into a compact form for convenient storage.

Figure 1:
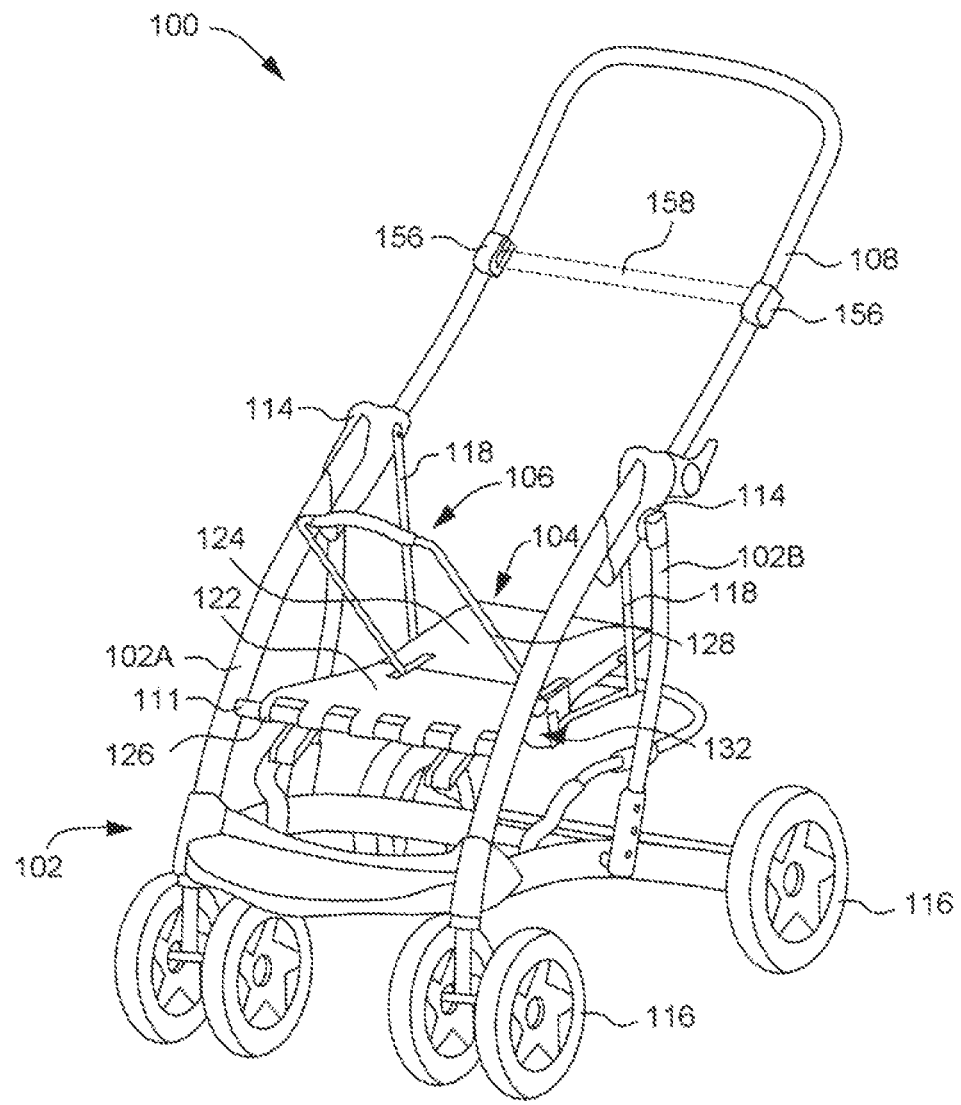
FIG. 1 is a perspective view illustrating a stroller embodiment of a infant carrier apparatus.

FIG. 1 is a perspective view illustrating a stroller embodiment of a infant carrier apparatus 100. The infant carrier apparatus 100 can include a support frame 102, a seat assembly 104, a backrest assembly 106 and a handle assembly 108. The support assembly 102 can include a front leg frame 102A, a rear leg frame 102B, a pair of pivoting links 114, and a plurality of wheels 116 coupled at lower ends of the front and rear leg frames 102A and 102B. Left and right upper ends of the front and rear leg frames 102A and 102B are respectively connected with left and right side segments of the handle assembly 108 via the pivoting links 114. Each of the pivoting links 114 can be provided with a latch mechanism (not shown) operable to lock and unlock the connection between the handle assembly 108 and the support frame 102. Once the pivoting links 114 are to be unlocked, the handle assembly 108 can be rotated and folded, which also the front and rear leg frames 102A and 102B to collapse.

The seat assembly 104 can comprise a tubular seat frame 123 (as better shown in FIG. 2), a front seat board 122 and a rear seat board 124. In one embodiment, the seat frame 123 can be connected with lower portions of the front and rear seat boards 122 and 124. A front edge of the front seat board 122 can include a fastener portion 126 for pivotally connecting the front end of the front seat board 122 with a transverse bar 111 of the front leg frame 102A. In one embodiment, the front and rear seat boards 122 and 124 can be permanently affixed or joined with each other to form a unitary seat support. In alternate embodiments, the front and rear seat boards 122 and 124 can be rotated relative to each other for facilitating the collapse of the rear seat board 124.

The support frame 102 can also include left and right hanging bars 118 respectively connected with each of the pivoting links 114. Left and right side edges of the rear seat board 124 can be pivotally connected with an end portion of the hanging bars 118 via rivets or like connecting elements defining a pivot axis (shown with a dotted line in FIG. 1). When the infant carrier apparatus 100 is folded, the hanging bars 118 can be driven in movement so as to drive the collapse of the seat assembly 104, thereby reducing the volume of the infant carrier apparatus 100.

As shown in FIG. 1, the backrest assembly 106 can include a tubular backrest frame 128 having a generally U-shape. Lower ends of the left and right side segments of the backrest frame 128 can be respectively connected with a backrest adjusting mechanism 132 that allow adjustment of the backrest frame 128 to different inclinations relative to the seat assembly 104. For example, the backrest frame 128 can be adjusted to a rearward inclined position (not shown), and a forward inclined position (as shown in FIG. 1). When the backrest frame 128 is inclined rearward, the front seat board 122 can be suitable for seating a child oriented forward. In contrast, when the backrest frame 128 is inclined forward, the rear seat board 124 can be suitable for seating a child oriented rearward.

Figure 2:
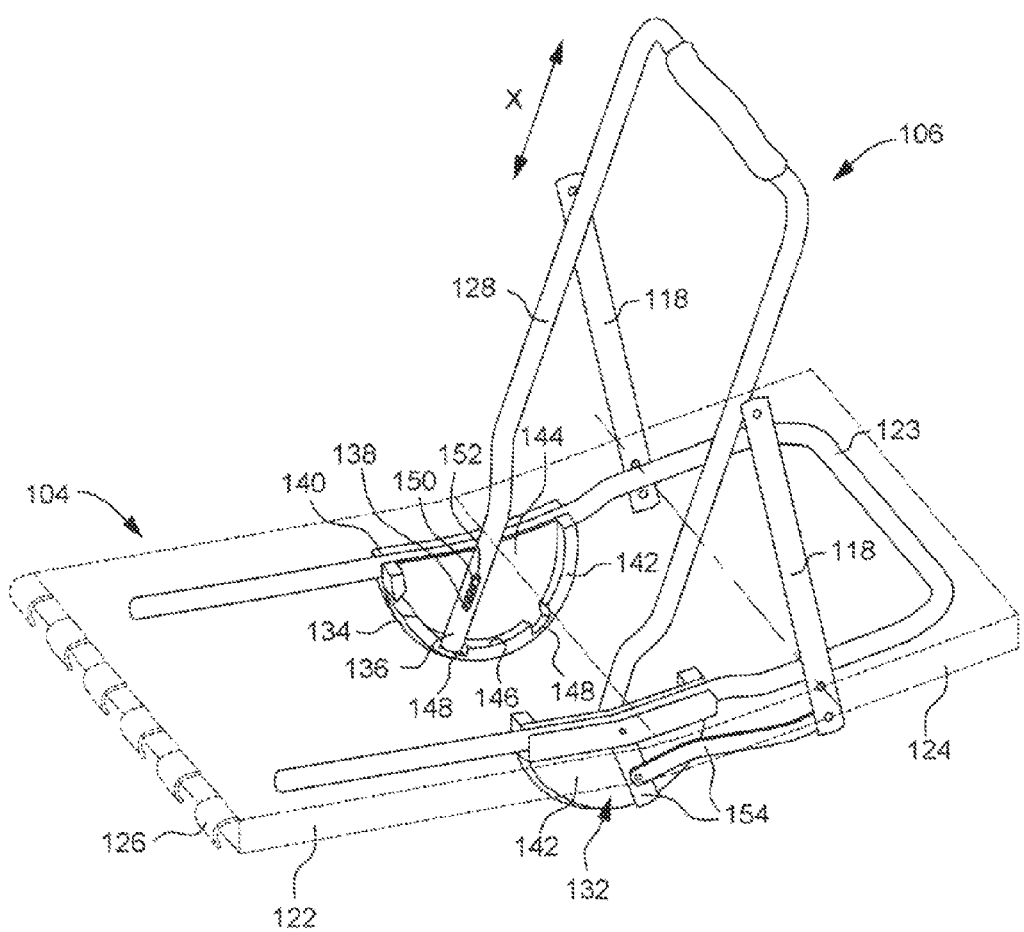
FIG. 2 is a schematic view illustrating the assembly of a backrest frame, backrest adjusting mechanisms and seat assembly in the infant carrier apparatus shown in FIG. 1.

FIG. 2 is a schematic view illustrating the assembly of the backrest frame 128, the backrest adjusting mechanisms 132 and the seat assembly 104. Each of the backrest adjusting mechanisms 132 can include a coupling base 134, and a latch 136 and spring element 138 respectively provided at a lower end of one side segment of the backrest frame 128.

In one embodiment, the coupling base 134 can be formed in a single body having a generally half-circular shape. A slot 140 can be provided at a larger section of the coupling base 134 for receiving and affixing the seat frame 123. The coupling base 134 also includes a disk portion 142 that extends generally vertically at one side of the slot 140. The disk portion 142 can include a recessed surface 144 provided at an inner side relative to the position of the slot 140. The recessed surface 144 can be at least partially delimited by a lower edge rim defined by a protruding flange 146. The recessed surface 144 and the flange 146 thereby at least partially delimit a lodging space in which the lower end of one side segment of the backrest frame 128 can be received. The flange 146 can have be partially circular in shape, and include a plurality of locking grooves 148 provided at different radial directions relative to the axis of rotation of the backrest frame 128. Each of the locking grooves 148 can have a shape adapted to receive the engagement of latch 136 for securely holding the backrest frame 128 at a desired inclination.

Referring again to FIG. 2, the lower end of the backrest frame 128 can include an elongated slot 150. A rivet 152 or like connecting elements can be engaged through a hole (not shown) of the recessed surface 144 and the elongated slot 150 for assembling the backrest frame 128 with the coupling base 134. The spring element 138 can be assembled in the side segment of the backrest frame 128 at a position proximate to its lower end. In particular, the spring element 138 can have a first end anchored with the rivet 152, and a second end anchored with an inner surface of the lower end of the backrest frame 128. The backrest frame 128 can thereby rotate relative to the seat assembly 104 about a pivot axis defined by the rivet 152. Moreover, guided by the sliding interaction between the rivet 152 and the elongated slot 150, the backrest frame 128 can also move parallel to its lengthwise axis X for either disengaging the latch 136 from one locking groove 148, or engaging the latch 136 with one locking groove 148 by action of the spring element 138.

As shown in FIG. 2, each of the backrest adjusting mechanisms 132 can also include a release actuator structure 154 that is operable to kick the latch 136 to disengage from one locking groove 148 when the infant carrier apparatus 100 is folded, thereby permitting the backrest frame 128 to self-adjust in accordance with the collapsing direction.

Referring to FIG. 1, the handle assembly 108 can be formed from a tubular structure having a generally U-shape. For assembling a child holding accessory, left and right side segments of the handle assembly 108 can respectively include a coupling fixture 156. In one embodiment, the two coupling fixtures 156 can slide parallel up and down along the side segments of the handle assembly 108, such that the positions of the coupling fixtures 156 can be adjusted relative to the backrest frame 128. For example, each of the coupling fixtures 156 can be adjusted to at a first position aligned with each other that is relatively closer to the backrest frame 128, and a second position aligned with each other that is relatively farther from the backrest frame 128. It will be appreciated that for manufacture cost considerations, alternate embodiments may also have the coupling fixtures 156 permanently affixed on the side segments of the handle assembly 108 to provide effective support for a child holding accessory as described hereafter.

Figure 5:
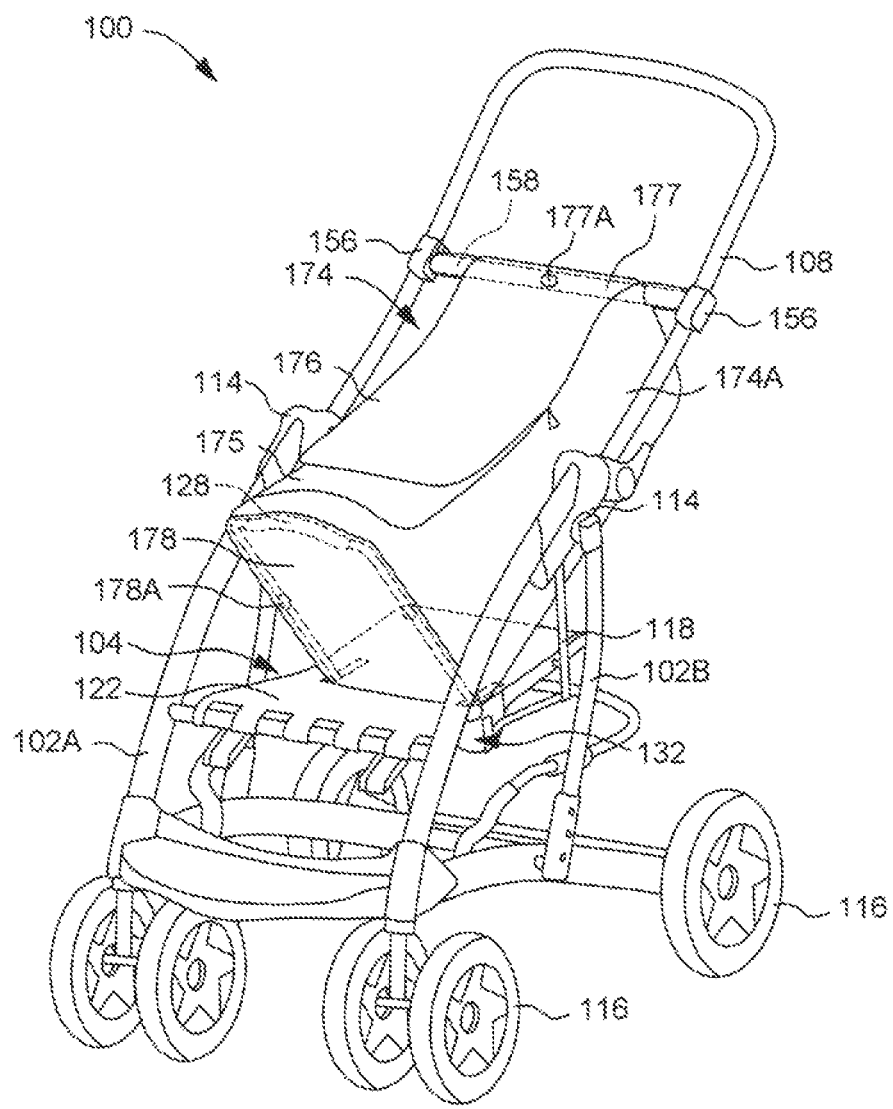
FIG. 5 is a schematic view illustrating one embodiment of the infant carrier apparatus provided with a detachable child holding accessory embodied as a sleeping capsule.

When a child holding accessory (e.g., a sleeping capsule 174 as shown in FIG. 5) is to be installed on the infant carrier apparatus 100, a support bracket 158 can be first assembled with the coupling fixtures 156 at a position above the seat assembly 104. The support bracket 158 and the backrest frame 128 can be then used as support for the child holding accessory placed above the seat assembly 104. The support bracket 158 can be designed according to any types of child holding accessory.

Figure 3:
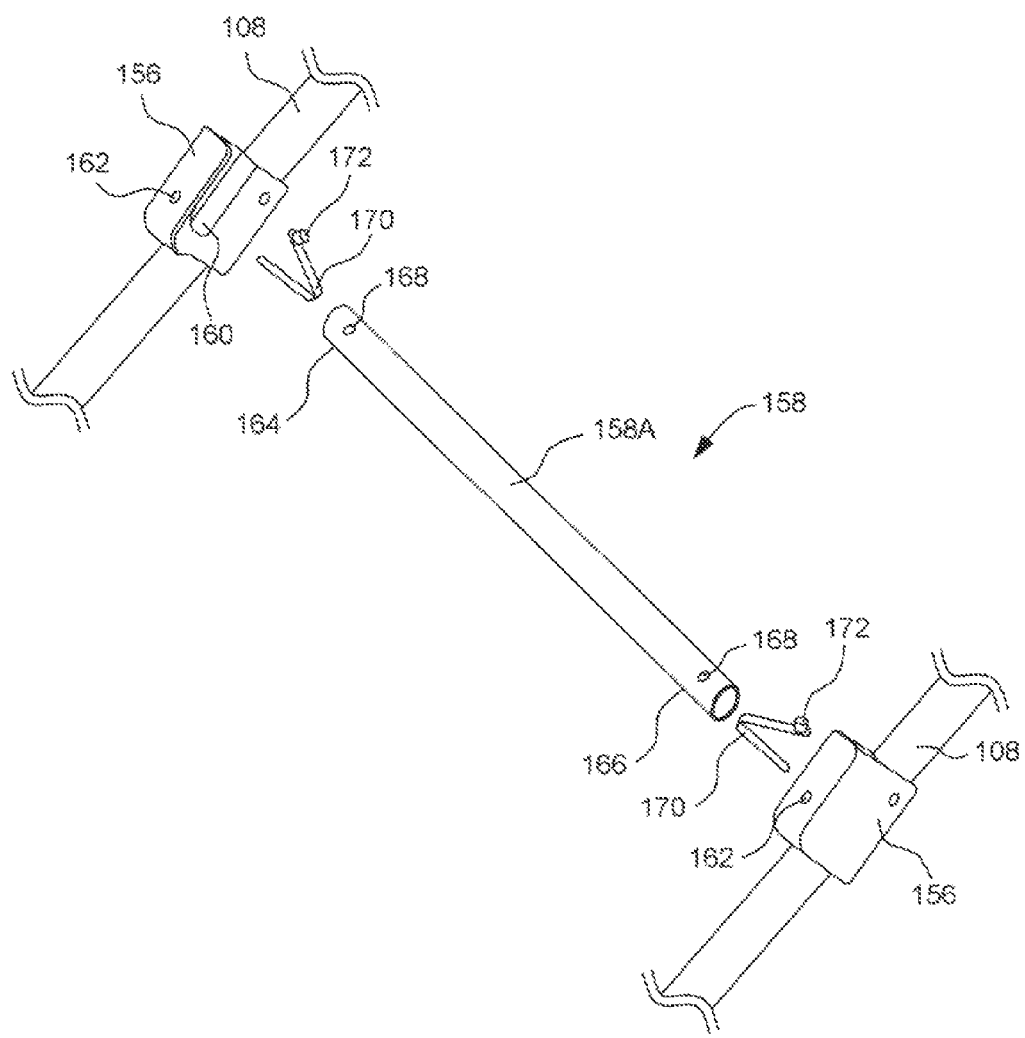
FIG. 3 is an exploded view illustrating the assembly of a support bracket with coupling fixtures provided on the infant carrier apparatus shown in FIG. 1.

FIG. 3 is an exploded view illustrating how the support bracket 158 can be mounted with the coupling fixtures 156, the support bracket 158 being adapted to mount a child holding accessory embodied as a sleeping capsule 174 illustrated in FIG. 5. Each of the coupling fixtures 156 can include a first side provided with an insert slot 160, and a second side provided with a hole 162 communicating with the insert slot 160.

In one embodiment, the support bracket 158 can include a transverse segment 158A having opposite first and second ends 164 and 166 that can respectively engage through the insert slots 160 of the coupling fixtures 156. The transverse segment 158A can be formed by a tube or bar. Each of the first and second ends 164 and 166 can have an outer surface provided with a hole 168, and an interior provided with a resilient member 170. In one embodiment, the resilient member 170 can be a piece of metallic material folded over itself to form two opposite side portions capable of elastically deflecting toward or away from each other. One of the side portions of the resilient member 170 can be provided with an engagement knob 172 that can protrude through the hole 168 when the resilient member 170 is mounted in the transverse segment 158A.

Figure 4:
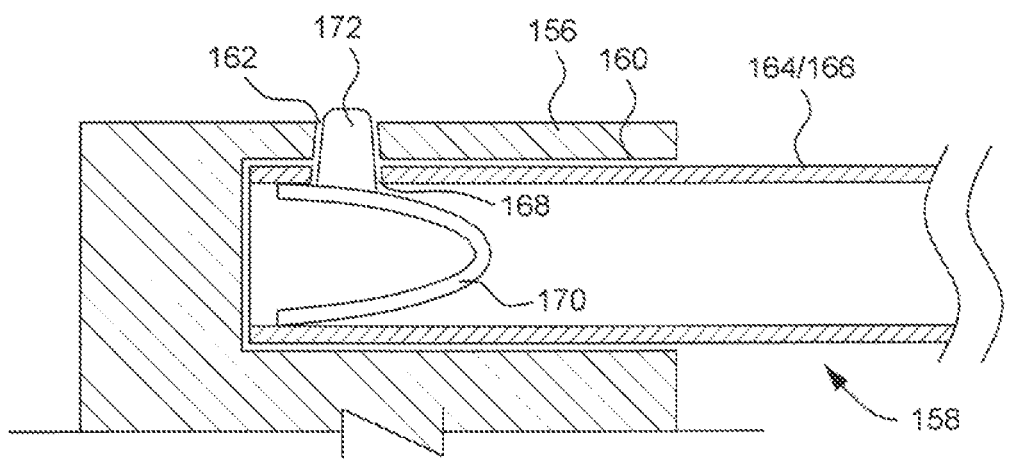
FIG. 4 is a cross-sectional view illustrating the assembly of the support bracket with the coupling fixtures.

In conjunction with FIG. 3, FIG. 4 is a cross-sectional view illustrating how the support bracket 158 can be mounted with each of the coupling fixtures 156. For clarity, only one coupling fixture 156 is shown, the coupling fixture 156 on the opposite side being assembled with the support bracket 158 in a similar manner. As the first and second ends 164 and 166 of the transverse segment 158A are respectively engaged through the insert slots 160 of the coupling fixtures 156 in alignment with each other, the engagement knob 172 of each resilient member 170 can be pressed inward by a sidewall of the insert slot 160. Once the engagement knob 172 reaches the position of the hole 162 on the coupling fixture 156, the resilient member 170 can elastically deflect to cause the engagement knob 172 to engage through the respective holes 168 and 162 and protrude outside the coupling fixture 156. The support bracket 158 can be thereby locked in position with the coupling fixtures 156.

If the support bracket 158 is to be dismounted, each of the engagement knobs 172 on the left and right side of the support bracket 158 can be depressed toward the interior of the insert slot 160 for its disengaging from the hole 162 of the associated coupling fixture 156. The support bracket 158 can then be removed from the coupling fixtures 156.

FIG. 5 is a schematic view illustrating one embodiment of the infant carrier apparatus 100 provided with a detachable child holding accessory embodied as a sleeping capsule 174. The sleeping capsule 174 can include an enclosure 174A and a support bracket 158. In the illustrated embodiment, the enclosure 174A can be exemplary made of a fabric material or like flexible materials, which can facilitate assembly and disassembly of the sleeping capsule 174. However, in alternate embodiments, the enclosure 174A can also be made of a rigid material such as plastics. The enclosure 174A can define at least partially an inner space 175 suitable for receiving a child in a seated or reclined position, and include a covering member 176 adapted to close an opening of the enclosure 174A. After the covering member 176 is unfolded to close the enclosure 174A, a fastener element (e.g., zipper or button) can be used to attach the covering member 176 on the enclosure 174A.

The enclosure 174A can have a first end portion 177 connected with the support bracket 158, and a second end portion 178 opposite to the first end portion 177 connected with the backrest frame 128 inclined forward. Accordingly, the sleeping capsule 174 can be arranged at a position between the handle assembly 108 and the backrest frame 128 and supported by the support bracket 158 and the backrest frame 128 above the front and rear seat board 122 and 124.

Exemplary operation for installing the sleeping capsule 174 is described hereafter with reference to FIGS. 3 and 5. Initially, the support bracket 158 can be inserted through the first end portion 177 of the enclosure 174A which can be provided with a fastener button 177A. With the first end portion 177 wrapped around the support bracket 158, the fastener button 177A can be then fastened to restrain displacement of the support bracket 158. Accordingly, the support bracket 158 can be securely held in place at the first end portion 177 of the enclosure 174A. Before mounting the sleeping capsule 174, the coupling fixtures 156 may also be adjusted along the side segments of the handle assembly 108 to suitable positions relative to the backrest frame 128. The support bracket 158 then can be affixed with the coupling fixtures 156, locked by the engagement knobs 172 of the resilient members 170 as described previously. Subsequently, the enclosure 174A can be stretched between the support bracket 158 and the backrest frame 128, and the second end portion 178 can be wrapped over the backrest frame 128. Eventually, a fastener button 178A provided on the second end portion 178 of the enclosure 174A can be fastened so as to lock the second end portion 178 in place. The second end portion 178 of the enclosure 174A is thereby securely held with the backrest frame 128.

For removing the sleeping capsule 174 from the infant carrier apparatus 100, the fastener button 178A can be detached, so that the second end portion 178 of the enclosure 174A can be removed from the backrest frame 128. Subsequently, the engagement knob 172 of the resilient element 170 on the left and right sides of the handle assembly 108 can be depressed to unlock the connection between the support bracket 158 and the coupling fixtures 156. The support bracket 158 can then be removed from the coupling fixtures 156 for full removal of the sleeping capsule 174. Subsequently, the enclosure 174A can be collapsed and folded into a compact form. It will be appreciated that the support bracket 158 (i.e., transverse segment 158A) ca also be removed from the enclosure 174A for separate storage.

At least one advantage of the infant carrier apparatus 100 described herein is the ability to detachably install a holding accessory that can provide support for a child close to the caregiver, at the rear of the infant carrier apparatus 100. Accordingly, additional child holding positions can be provided in addition to the conventional seating areas in accordance with the user's demands. While an instance of the child holding accessory has been previously described as a sleeping capsule embodiment, other types of the child holding accessory are also possible as described hereafter.

Figure 6:
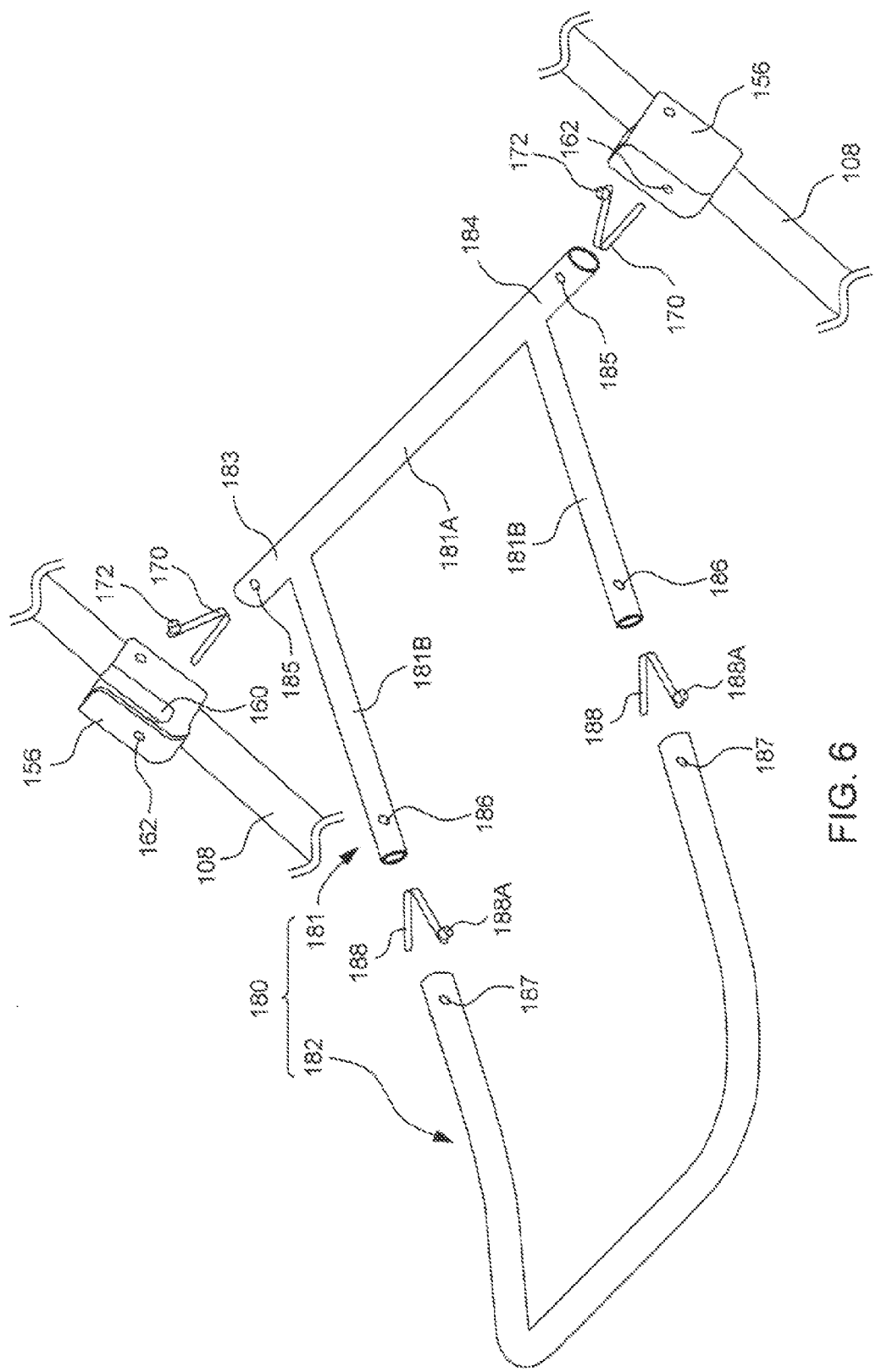
FIG. 6 is an exploded view illustrating the assembly of a support bracket with the coupling fixtures for installing another embodiment of a child holding accessory.
Figure 8:
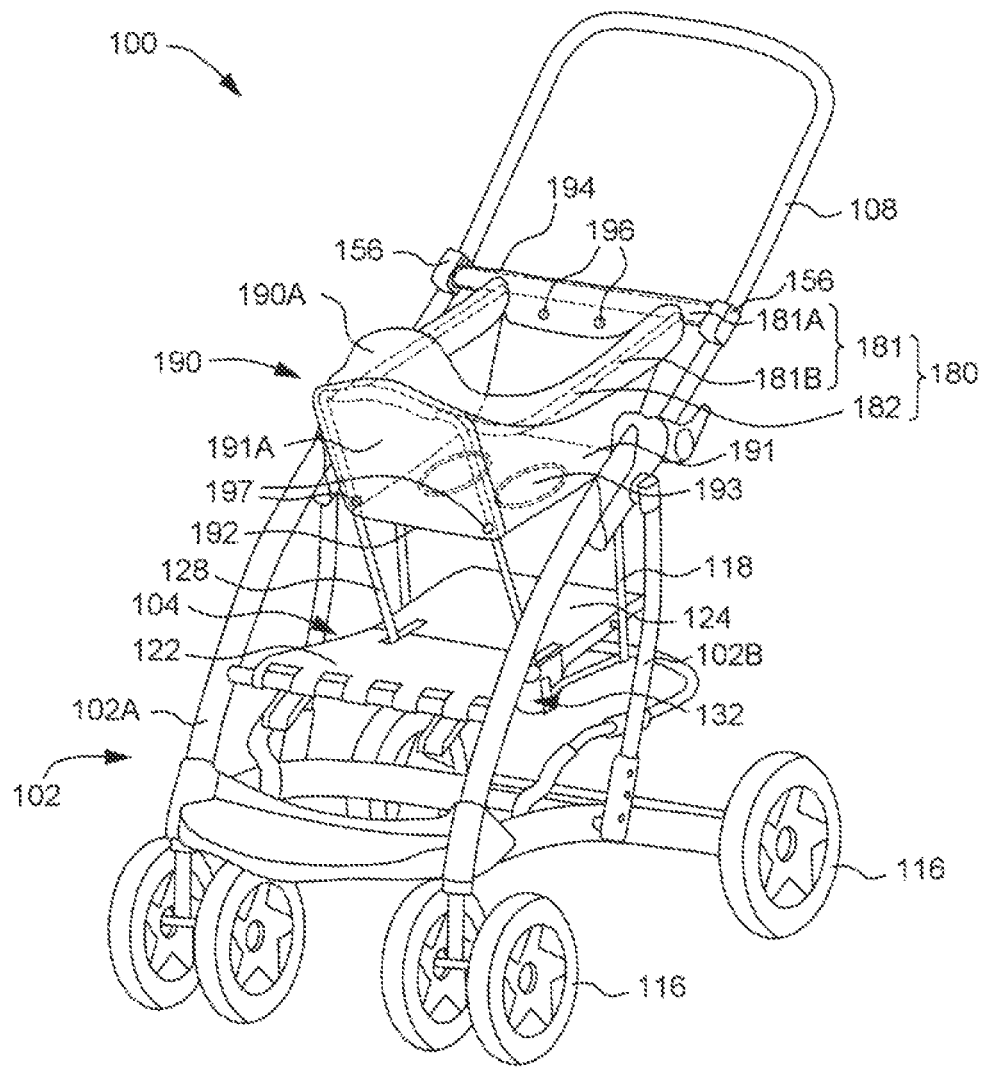
FIG. 8 is a schematic view illustrating the infant carrier apparatus provided with a child holding accessory embodied as a seating support.

FIG. 6 is an exploded view illustrating the assembly of a support bracket 180 with the coupling fixtures 156 for installing another embodiment of a child holding accessory (e.g., a seating support 190 as shown in FIG. 8). The support bracket 180 can include a first and second bracket member 181 and 182 that can be detachably assembled together. The first bracket member 181 can include a transverse segment 181A, and two generally parallel side segments 181B joined with two opposite end portions of the transverse segment 181A and extending in a same direction. In addition, the transverse segment 181A also has two opposite distal ends 183 and 184 that extend beyond the side segments 181B, each of the distal ends 183 and 184 having a circumferential surface respectively provided with a hole 185. Each of the side segments 181B also has a distal end that has a circumferential provided with a hole 186.

A resilient member 188 can be mounted through the distal end of each of the side segments 181B. In one embodiment, the resilient member 188 can be a piece of metallic material folded over itself to form two opposite side portions capable of elastically deflecting toward or away from each other, one of the side portions of the resilient member 188 being provided with an engagement knob 188A. Resilient members 170 can also be respectively provided in the interior of the distal ends 183 and 184 of the transverse segment 181A, the engagement knob 172 of each resilient member 170 protruding through the corresponding hole 185.

Referring again to FIG. 6, the second bracket member 182 can be formed as a generally U-shaped tubular element. The two hollow distal ends of the second bracket member 182 can have an inner diameter that is larger than the outer diameter of the distal ends of the side segments 181B. Moreover, each of the two distal ends of the second bracket member 182 also respectively has a circumferential surface provided with a hole 187.

Figure 7:
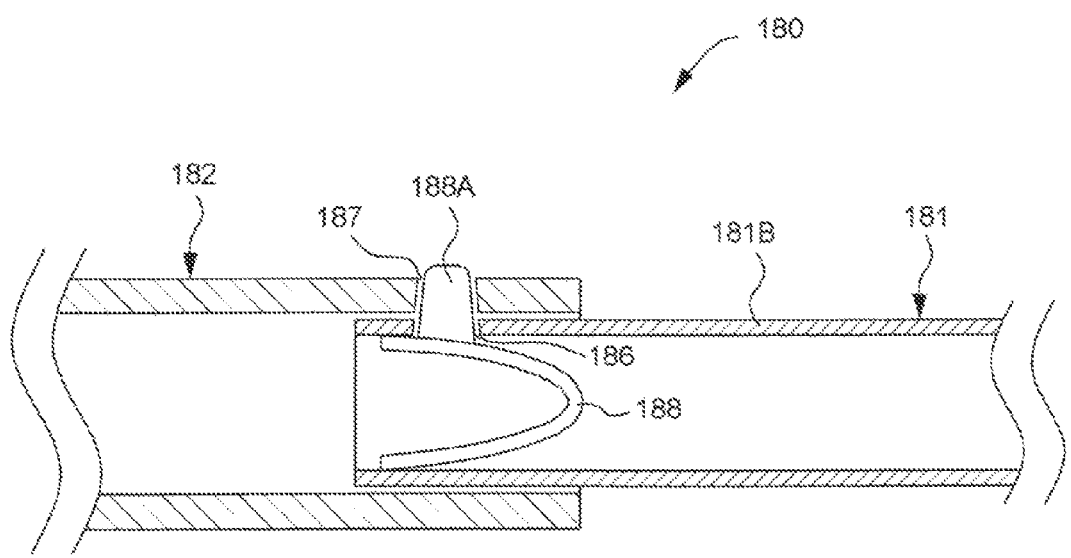
FIG. 7 is a partial cross-sectional view illustrating one embodiment of a support bracket formed by the assembly of first and second bracket members.

FIG. 7 is a partial cross-sectional view illustrating the first and second bracket members 181 and 182 assembled together to form the support bracket 180. When the side segments 181B of the first bracket member 181 are respectively inserted through the second bracket member 182, the engagement knob 188A of each resilient member 188 can respectively engage through the holes 186 and 187 of the side segments 181B and second bracket member 182, thereby locking together the first and second bracket members 181 and 182. If the support bracket 180 is to be disassembled, the engagement knobs 188A can be respectively depressed to disengage from the corresponding holes 187. The second bracket member 182 can be then detached from the first bracket member 181.

Referring again to FIG. 6, the support bracket 180 can be assembled with the coupling fixtures 156 via the resilient members 170 like the previously described support bracket 158. More specifically, the engagement knob 172 of each resilient member 170 can be squeezed by the sidewall of the corresponding insert slot 160 as each of the distal ends 183 and 184 of the transverse segment 181A is respectively inserted through the insert slot 160 of the corresponding coupling fixture 156. When the engagement knob 172 protruding from the circumferential surface of each of the distal ends 183 and 184 reaches the position of the corresponding hole 162, the resilient member 170 can urge the engagement knob 172 to engage through the holes 185 and 156 and protrude outside the corresponding coupling fixture 156. The support bracket 180 can be thereby locked with the coupling fixtures 156 on the side segments of the handle assembly 108.

FIG. 8 is a schematic view illustrating the infant carrier apparatus 100 provided with a child holding accessory embodied as a seating support 190. The seating support 190 is placed above the front and rear seat boards 122 and 124, and can include an enclosure 190A and the support bracket 180. In one embodiment, the seating support 190 can be formed from a fabric or like soft and flexible materials for facilitating its arrangement for installation, disassembly and storage. The enclosure 190A can include a plurality of sidewalls 191 and a bottom 192. The sidewalls 191 surrounds the bottom 192 to define a seating area of the seating support 190. The bottom 192 can include two openings 193 for passage of the legs of a child placed in the seating support 190. When a child is placed in the seating support 190, the legs of the child can pass through the two openings 193 and rest on the underlying front and/or rear seat board 122 and 124.

Referring again to FIG. 8, an end portion 194 of the enclosure 190A, which may be connected with a top end of one of the sidewalls 191, can be held on the transverse segment 181A of the support bracket 180. A sidewall 191A of the seating support 190 opposite to the end portion 194 can be held with the backrest frame 128 being inclined forward. Moreover, the second bracket member 182 and the side segments 181B of the first bracket member 181 can be arranged so as to extend around the sidewalls 191. The seating support 190 can be thereby held by the support bracket 180 and backrest frame 128 at a position above the seat boards 122 and 124 and between the handle assembly 108 and the backrest frame 128.

Exemplary operation for installing the seating support 190 is described hereafter with reference to FIGS. 6 and 8. Initially, the second bracket member 182 can be inserted through the enclosure 190A. Then, the distal ends of the side segments 181B can be inserted through the distal ends of the second bracket member 182, until the engagement knobs 188A of the resilient members 188 respectively engage and lock the side segments 181B with the second bracket member 182. After the end portion 194 of the enclosure 190A is wrapped around the transverse segment 181A and held thereon, a fastener button 196 provided on the end portion 194 can be fastened to restrainedly hold the end portion 194 in place. If necessary, the coupling fixtures 156 may also be adjusted along the side segments of the handle assembly 108 for setting the adequate positions of the coupling fixtures 156 relative to the backrest frame 128. The transverse segment 181A then can be fixedly fastened with the coupling fixtures 156 via the resilient members 170 as described previously. Subsequently, the sidewall 191A of the enclosure 190A can be wrapped around a portion of the backrest frame 128, such that the enclosure 190A is stretched between the support bracket 180 and the backrest frame 128. Eventually, the fastener button 197 can be fastened to restrainedly hold the sidewall 191A in place. The seating support 190 can be thereby installed at an elevated position above the front and rear seat boards 122 and 124.

In case the seating support 190 is to be detached, the fastener button 197 can be unfastened so that the sidewall 191A can be removed from the backrest frame 128. Moreover, the engagement knobs 172 of the resilient members 170 can be depressed to unlock the connection between the support bracket 180 and the coupling fixtures 156. The transverse segment 181A then can be removed from the coupling fixtures 156. After full removal of the seating support 190, the fastener button 196 can be detached, such that the support bracket 180 can be entirely removed from the enclosure 190A. The enclosure 190A can be thereby collapsed and folded into a compact form that facilitates its storage.

It is worth noting that the inclination of the backrest frame 128 and/or the positions of the coupling fixtures 156 on the handle assembly 108 can be adjusted for suitably accommodating different sizes of the child holding accessory. Accordingly, the child holding accessory can be designed to provide support for a child in a more comfortable manner compared to the front and rear seat boards 122 and 124. When it is not used, the child holding accessory can be easily removed from the infant carrier apparatus 100. Moreover, the child holding accessory can be made of a soft and flexible material that can be conveniently collapsed and folded for facilitating its storage.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child holding accessory adapted to detachably assemble with an infant carrier apparatus, wherein the infant carrier apparatus comprises a backrest frame, and a handle assembly having a left and a right side segment spaced apart from each other by a gap, the child holding accessory comprising:

a support bracket operable to detachably affix with the left and right side segments across the gap, wherein the support bracket includes a generally U-shape that extends toward the backrest frame once the support bracket is affixed with the handle assembly; and an enclosure adapted to provide support for a child, the enclosure including a support surface adapted to sustain the weight of the child, and a fabric material connected with the support surface, the support surface of the enclosure being suspended between the backrest frame and the support bracket when the child holding accessory is installed with the infant carrier apparatus;

wherein the fabric material of the enclosure has two opposite end portions adapted to wrap at least partially around the backrest frame and the support bracket affixed with the handle assembly to attach the child holding accessory with the infant carrier apparatus.

2. The child holding accessory according to claim 1, wherein the fabric material forms at least two opposite sidewalls connected with the support surface of the enclosure, the two opposite sidewalls being attached with the support bracket and the backrest assembly when the child holding accessory is installed with the infant carrier apparatus.

3. The child holding accessory according to claim 1, wherein the enclosure defines a sleeping capsule or a seating support.

4. A method of installing a child holding accessory on an infant carrier apparatus, wherein the infant carrier apparatus comprises a backrest frame and a handle assembly, and the child holding accessory includes a support bracket and an enclosure including a fabric material, the method comprising:
 placing the backrest frame in a position inclined toward a front of the infant carrier apparatus, while the handle assembly is inclined toward a rear of the infant carrier apparatus opposite to the backrest frame;
 affixing the support bracket with the handle assembly;
 attaching a first side portion of the fabric material with the backrest frame in the position inclined toward the front; and
 attaching a second side portion of the fabric material with the support bracket.

5. The method according to claim 4, wherein the enclosure includes a support surface adapted to sustain the weight of a child, the support surface being suspended between the backrest frame and the handle assembly when the first and second side portions of the fabric material are attached with the backrest frame and the support bracket.

6. The method according to claim 4, wherein the step of attaching a second side portion of the fabric material with the support bracket is performed before affixing the support bracket with the handle assembly.

7. The method according to claim 4, wherein the step of attaching a second side portion of the fabric material with the support bracket includes causing the second side portion of the fabric material to wrap at least partially around the support bracket.

8. The method according to claim 4, wherein the step of attaching a first side portion of the fabric material with the backrest frame includes causing the first side portion of the fabric material to wrap at least partially around the backrest frame.

9. The method according to claim 4, wherein the handle assembly has a left and a right side segment spaced apart from each other by a gap, and the step of affixing the support bracket with the handle assembly includes installing the support bracket across the gap between the left and right side segments of the handle assembly.

10. The method according to claim 4, wherein the infant carrier apparatus is a stroller apparatus that has a seating surface, and the enclosure includes a support surface adapted to sustain the weight of a child, the support surface being suspended above the seating surface when the child holding accessory is installed on the infant carrier apparatus.

* * * * *